(12) United States Patent
Howard

(10) Patent No.: US 6,520,520 B2
(45) Date of Patent: Feb. 18, 2003

(54) STEERING STABILIZER WITH TRIMMING ACCUMULATOR

(76) Inventor: Durrell U. Howard, 199 W. Rhapsody Dr., San Antonio, TX (US) 78216

(*) Notice: Subject to any disclaimer, the term of this patent is extended or adjusted under 35 U.S.C. 154(b) by 0 days.

(21) Appl. No.: 10/105,868

(22) Filed: Mar. 25, 2002

(65) Prior Publication Data

US 2002/0140197 A1 Oct. 3, 2002

Related U.S. Application Data

(63) Continuation-in-part of application No. PCT/US02/04449, filed on Feb. 15, 2002, which is a continuation-in-part of application No. 09/699,520, filed on Oct. 31, 2000, now Pat. No. 6,422,582.

(51) Int. Cl.⁷ ................................................. B62D 7/22
(52) U.S. Cl. ........................ 280/90; 280/89.12; 180/421
(58) Field of Search ............................... 280/90, 89.11, 280/89.12, 89.13, 268; 180/417, 421, 422, 441; 74/388 PS, 495, 496, 89.25

(56) References Cited

U.S. PATENT DOCUMENTS

| | | |
|---|---|---|
| 962,257 A | 6/1910 | Rockwell |
| 3,583,515 A | 6/1971 | Schwenk |
| 3,695,204 A | 10/1972 | Bennett |
| 3,863,947 A | 2/1975 | Weston |
| 3,870,335 A | 3/1975 | Schultz |
| 3,882,953 A | 5/1975 | Maisch |
| 4,410,193 A | 10/1983 | Howard |
| 4,418,931 A | 12/1983 | Howard |
| 4,467,884 A | 8/1984 | Roberston et al. |
| 4,534,577 A | 8/1985 | Howard |
| 4,558,878 A | 12/1985 | Motrenec |
| 4,588,198 A | 5/1986 | Kanazawa et al. |
| 4,634,135 A | 1/1987 | Nakata et al. |
| 4,903,973 A | 2/1990 | Bray |
| 5,076,383 A | 12/1991 | Inoue et al. |
| 5,527,053 A | 6/1996 | Howard |
| 5,536,028 A | 7/1996 | Howard |
| 5,816,594 A | 10/1998 | Howard |
| 6,003,887 A | 12/1999 | Howard |
| 6,065,561 A | 5/2000 | Howard |
| 6,267,395 B1 | 7/2001 | Howard |
| 6,272,947 B1 | 8/2001 | Howard |
| 6,422,582 B1 * | 7/2002 | Howard ...................... 280/90 |

FOREIGN PATENT DOCUMENTS

CA 908012 8/1972

* cited by examiner

Primary Examiner—Paul N. Dickson
Assistant Examiner—David R. Dunn
(74) Attorney, Agent, or Firm—Townsend M Belser, Jr.; Nexsen Pruet Jacobs & Pollard LLC

(57) ABSTRACT

A linkage assembly (10) of remotely adjustable length extends between a steerable member (17) and a frame member (12) to define the center position of the steerable member (17). The linkage assembly includes a resistance assembly (30) for providing a resistance force resisting forces tending to move the steerable member (17) to either side of the center position, and a trim assembly (28) having a piston (36) that may be locked in position (C1) in a trim cylinder (33) for transmitting steering forces to the resistance assembly (30). A trim valve (52, 52', 52," 301) is operable between a closed position for preventing trim fluid flow so that the piston (36) is held in its locked position (C1), and an open position for allowing the trim piston (36) to move away from its prior locked position (C1) to a new locked position (C2) to permit the length of the linkage (10) to be changed in response to a steering force applied to the steering wheel. A liquid pressurized by a gas from a gas pressure source (88) is provided to the resistance assembly (30) and to the trim assembly (28) by a single joint accumulator assembly (275) or by a dual accumulator assembly (75, 175). The dual accumulator assembly (75, 175) provides liquid at two different pressures, one for the resistance assembly (30) and the other for the trim assembly (28).

25 Claims, 8 Drawing Sheets

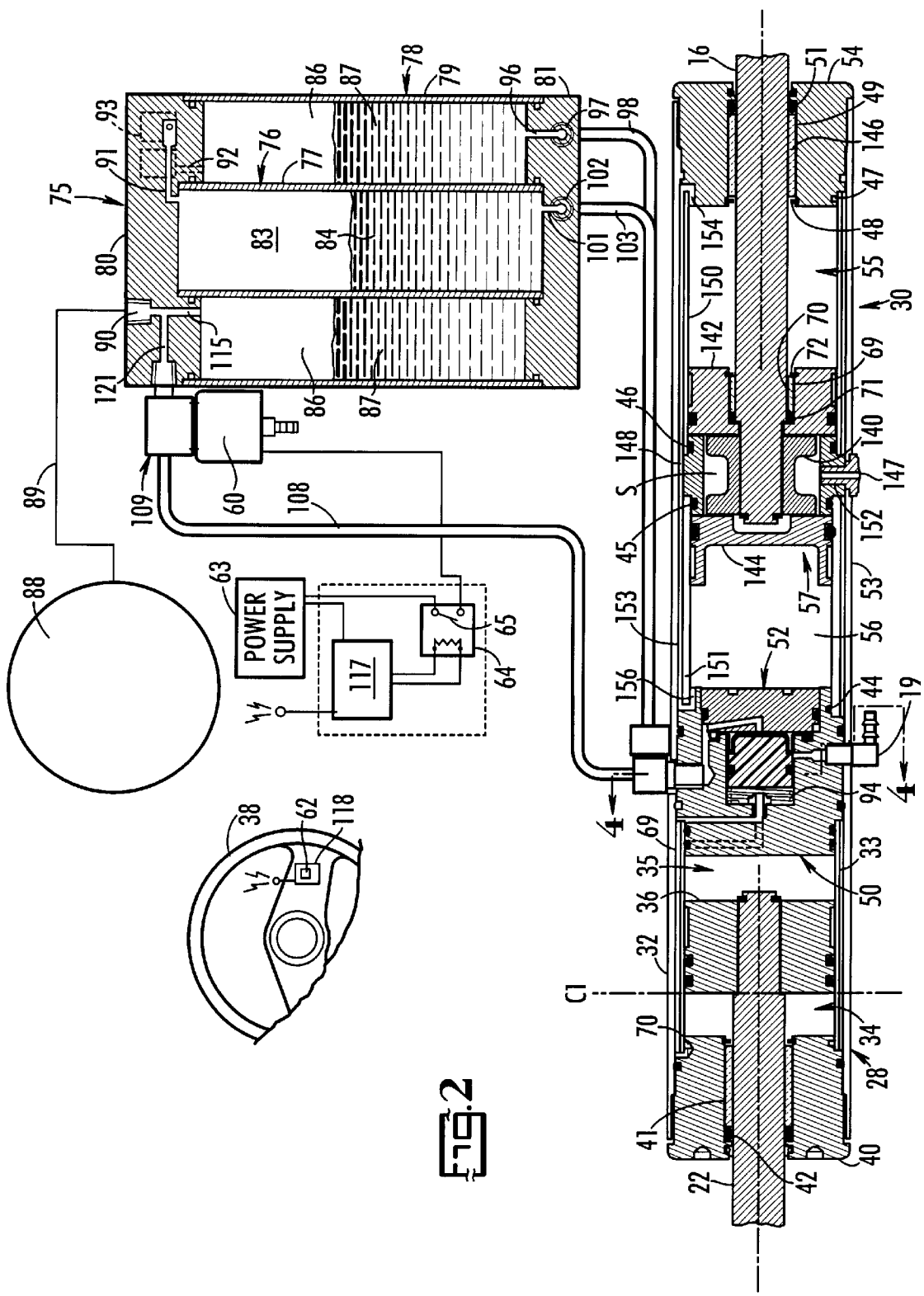

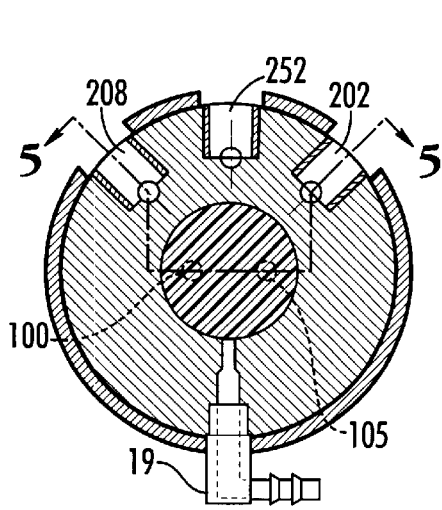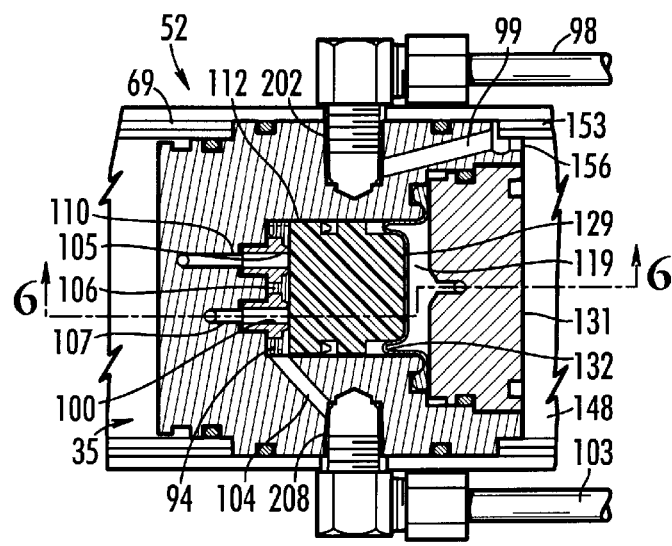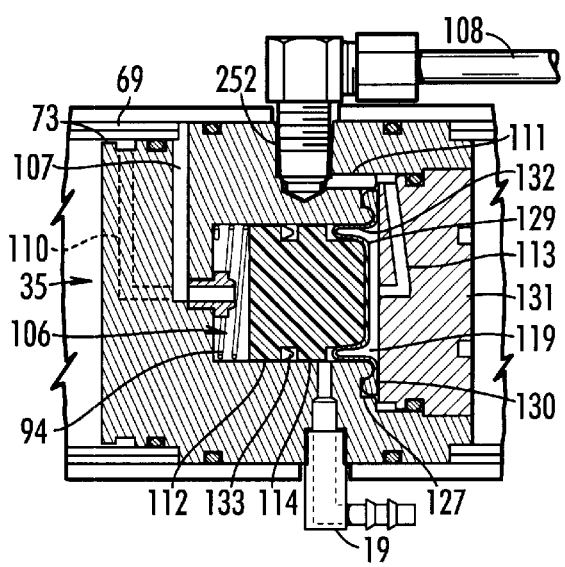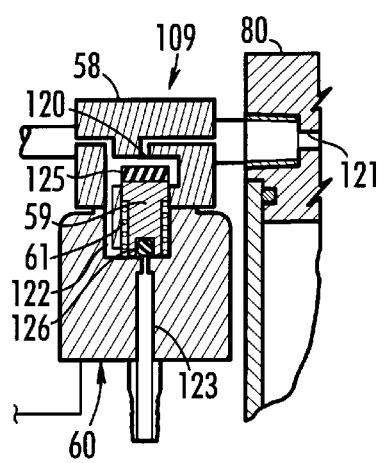

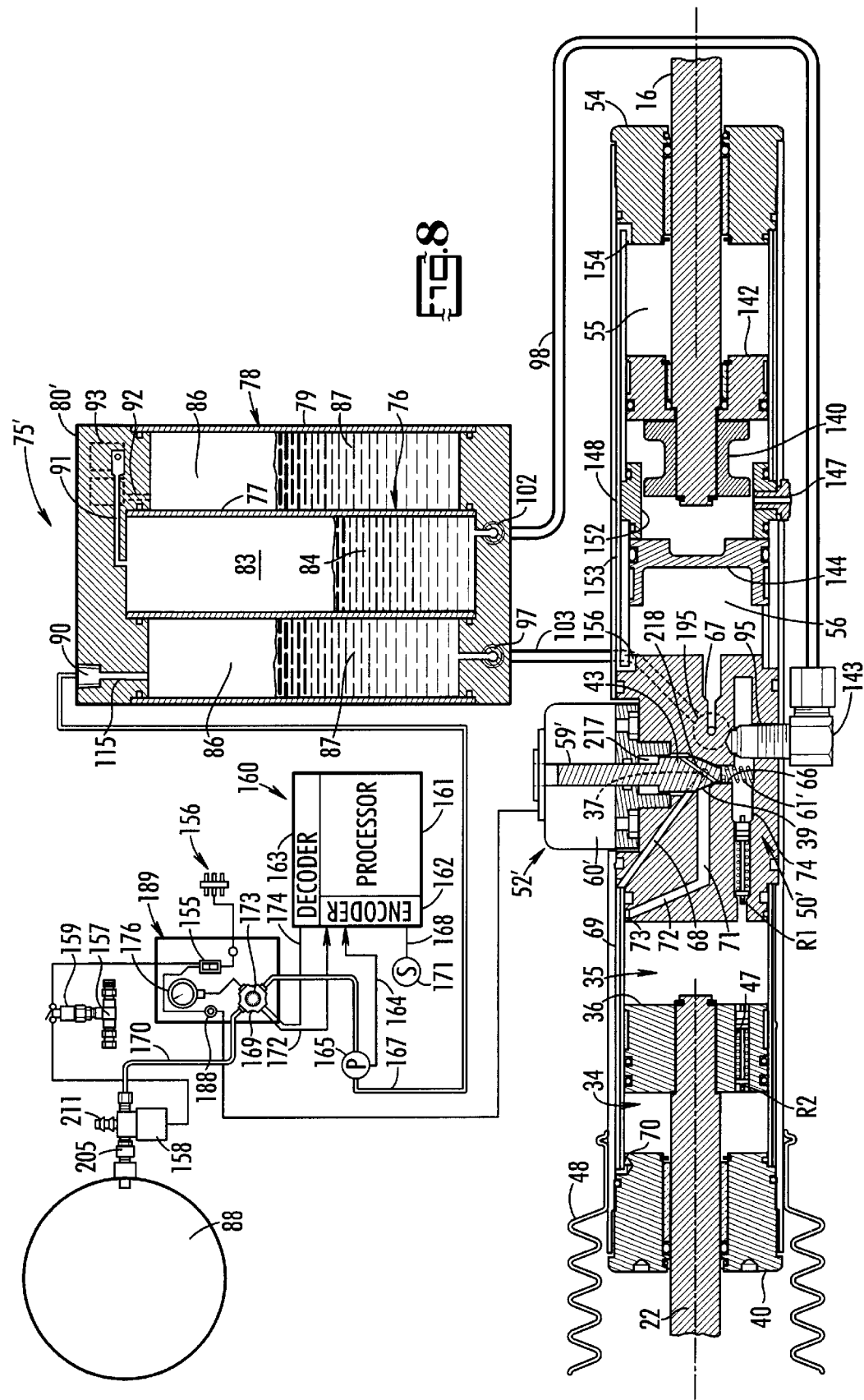

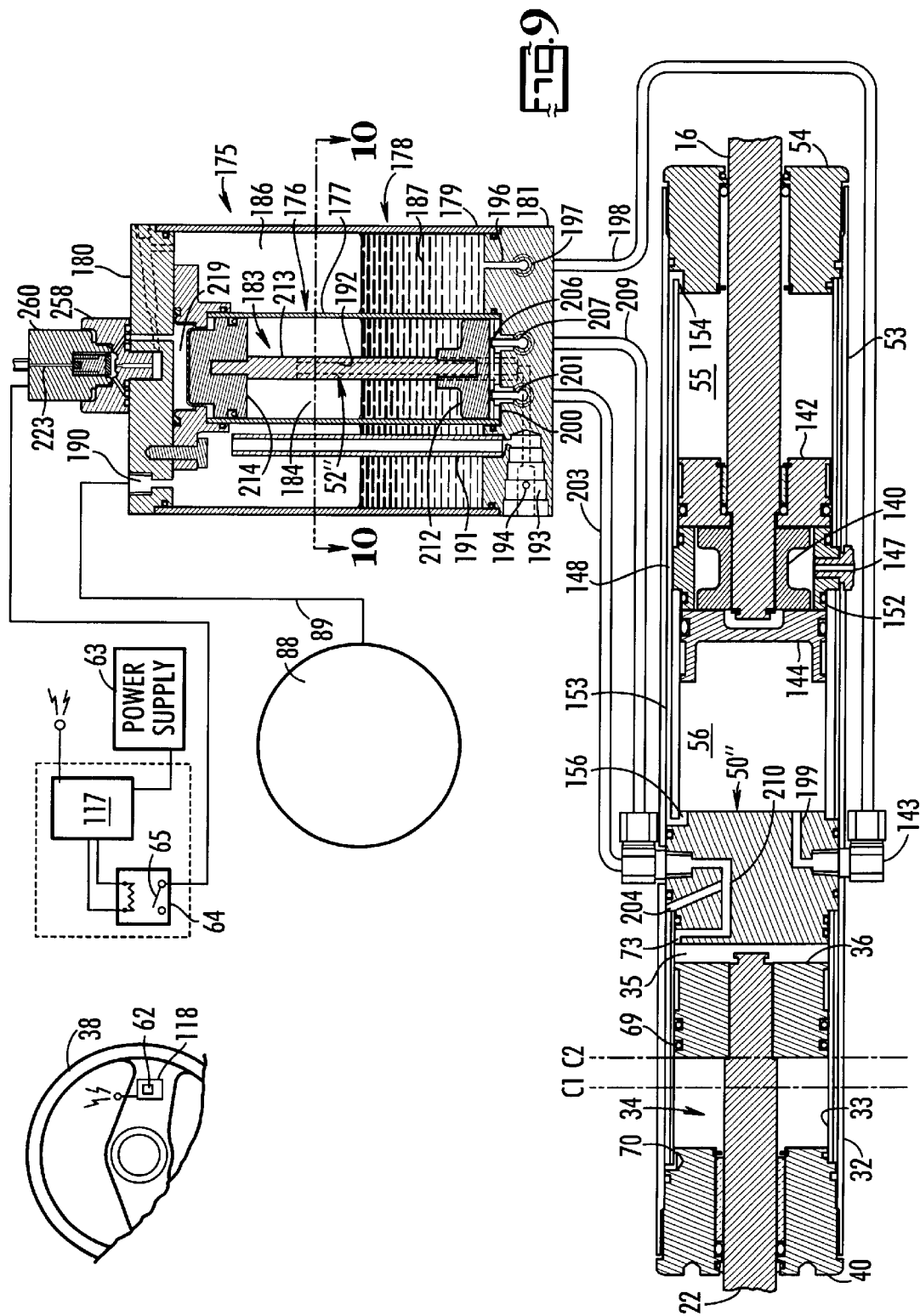

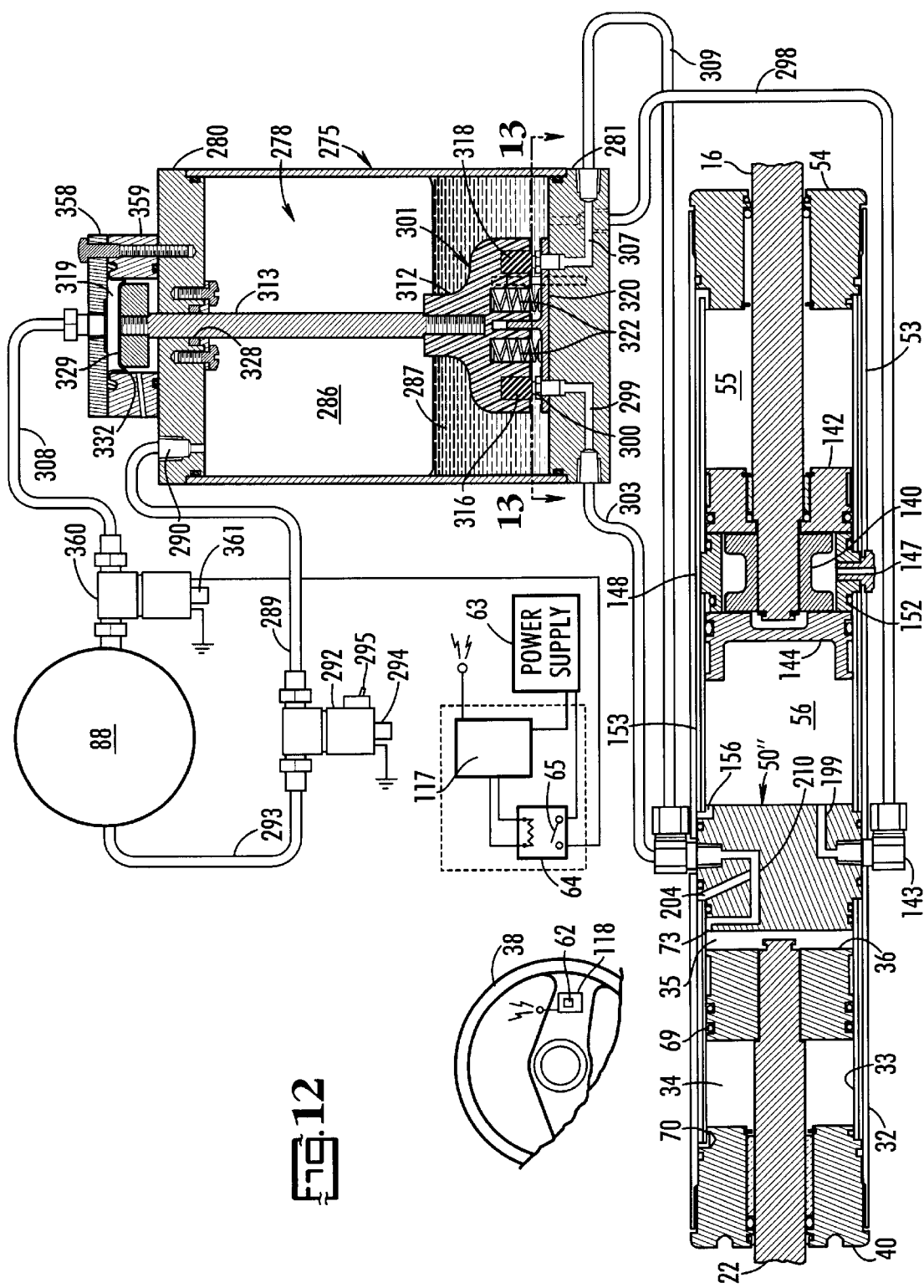

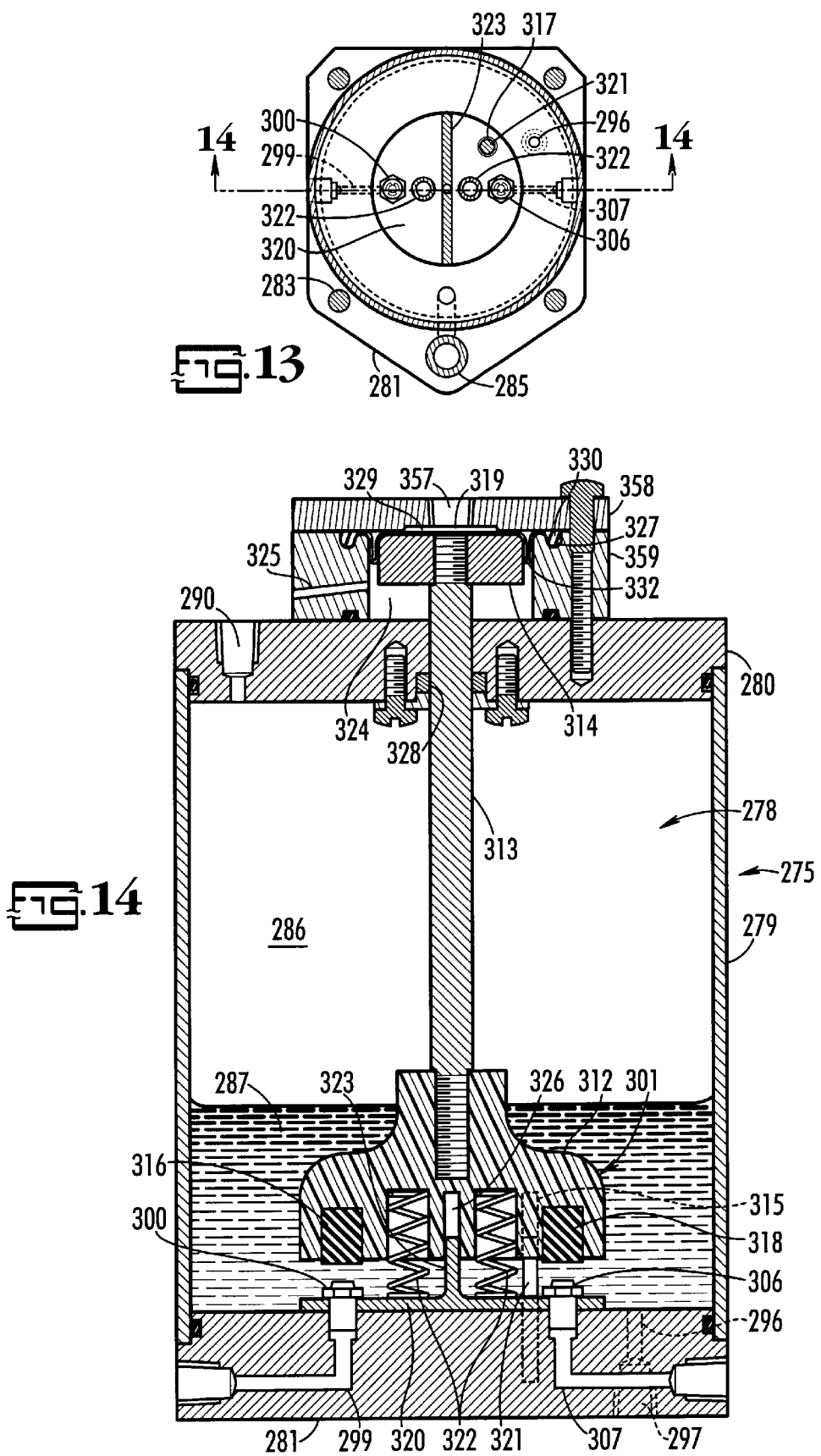

STEERING STABILIZER WITH TRIMMING ACCUMULATOR

RELATED APPLICATIONS

This is a continuation-in-part of my prior PCT International Application PCT/US02/04449 filed Feb. 15, 2002, designating the U.S. and entitled STEERING STABILIZER WITH DUAL ACCUMULATORS, which is a continuation-in-part of my prior U.S. patent application Ser. No. 09/699,520 now U.S. Pat. No. 6,422,582 filed Oct. 31, 2000, on a Center Holding Assembly For Vehicle Steering Systems, the entire contents of both of these applications being incorporated herein by reference.

FIELD OF THE INVENTION

This invention relates to vehicle steering systems and more particularly to a device for holding the steerable wheels of a vehicle, such as a motor home, bus, truck, automobile or the like, so that a center steering position is maintained in spite of spurious steering inputs, such as those caused by variable crosswinds, crown curvature or slant of the highway, or other factors tending to adversely affect vehicle steering by the driver.

BACKGROUND OF THE INVENTION

The steering systems of highway vehicles and the like are designed primarily for driver control. In these systems, the steering force required on the steering wheel and the ratio between steering wheel movement and movement of the steerable ground wheels depend upon the characteristics of the particular vehicle and the conditions under which it will usually be operated. A wide variety of extraneous forces can act on a vehicle steering system and spurious steering inputs caused by these forces must be dealt with satisfactorily in order to provide stable and controllable steering of a vehicle. As vehicle speed increases, the effects of any spurious steering inputs are magnified, making it necessary for the driver to exercise more precise and careful driving control.

Vehicles with steering systems having positive caster generally track relatively straight ahead and generally resist normal steering inputs away from center, including those of the driver. Intentional turning maneuvers by the driver therefore require sufficient turning force to overcome this positive resistance to movement away from center. When the driver relaxes the turning force applied to the steering wheel, a positive caster system has a definite tendency to return to its straight ahead position, although it may overshoot the neutral or center position if the steering wheel is entirely released.

While positive caster is desirable in some respects, it is not without compromises over the full steering spectrum. For example, the adverse effects of strong gusty cross winds are usually more pronounced with large amounts of positive caster. As its name would imply, the vehicle tends to caster towards the side of the roadway to which it is being pushed by the wind. Thus, the adverse steering inputs caused by crosswinds are directly related to the amount of positive caster offset, which is a classic example of having to balance a benefit with a detriment. The small amount of stability gained from castering the steerable wheels on a non-windy day may be paid for many times over when driving in a crosswind because of the destabilizing effect of the crosswind caused by positive caster offset. Positive caster offset also allows steering inputs from rutted and other imperfect roadway surfaces to steer back against the driver and thereby cause road wander, which is a universal driving complaint, particularly by driver's of heavy vehicles such as trucks and motor homes. Similarly, a high crown at the center of the roadway or a slanted roadway can cause vehicles to turn toward the edge of the roadway, that is, in the downhill direction. In addition, generous positive caster provides significant resistance to small radius turns, which can make city driving quite fatiguing. These adverse effects are some of the negative aspects of achieving steering stability through generous amounts of positive caster.

For the lack of a more advanced method, steerable wheel castering has been accepted by the industry as a low-cost method of achieving steerable wheel returnability. Accordingly, many over-the-road vehicles are provided with generous amounts of positive caster. Not much thought has been given to the self-defeating side effects of steerable wheel castering. The failure of the industry to recognize the critical need to provide directional stability by replacing steerable wheel castering with another method of achieving steerable wheel returnability may go down in history as one of the longest enduring vehicle design oversights.

Thus, a highly important consideration that has long been overlooked by the industry is that steerable wheel castering is directly responsible for road wander, crowned road steering wheel pull and cross wind steering problems. Keeping a vehicle tracking straight and under control currently requires an inordinate amount of driver steering corrections to counteract the adverse side effects of castered wheels. The repetitive task of making thousands of precise steering corrections mile after mile weighs heavily on a driver's physical and mental well-being, and may result in extreme driving fatigue. Thus, vehicle directional stability can best be achieved by stabilizing the on-center behavior of the steerable wheels with a more suitable method than the traditional steerable wheel castering used on many current production vehicles.

Another drawback of prior art steering systems is that spurious inputs transmitted from the roadway through the steerable wheels affect substantially the entire steering assembly before encountering any stabilizing resistance from the steering wheel. The transmission of these inputs between the steerable wheels and the steering wheel causes the interconnecting components of the steering system to repeatedly oscillate between states of tension and compression. Such oscillations cause wear and slack in ball joints and other connections and have long been considered a primary source of stress fatigue which can lead to premature failure of various steering system components. Mechanical slack due to worn parts can also be a cause of steering system oscillations and vehicle wandering that require constant corrections and therefore produce driver fatigue.

The ideal driving situation is therefore one where the steering system inherently causes the vehicle to travel in an unswerving straight line unless the driver intentionally turns the vehicle in another direction. Thus, the ideal steering system would require relatively little attention from the driver as the vehicle progresses along a straight line path down the roadway. From a steering standpoint, the vehicle should not respond to anything but the driver's steering commands and these must be of sufficient magnitude to overcome a significant resistance to turning away from center. In the absence of a steering input by the driver, the vehicle should literally do nothing but progress straight ahead.

SUMMARY OF THE INVENTION

The invention provides a center stabilizer assembly for improved on-center holding of the steerable wheels, and significantly reduces driver fatigue because it results in a major reduction in driver steering inputs. The stabilizer assembly is easily activated by the driver while driving the vehicle, and its activation makes driving more pleasurable and less fatiguing. The stabilizer assembly comprises linkage means of variable length that extends between the steerable wheels and an axle or frame member such that the length of the linkage means defines the center position of the steering system. The linkage means comprises a resistance assembly that provides a resistance force for resisting steering forces tending to move the steerable wheels to either side of the center position, and a trim assembly for changing the center position to be maintained by the resistance assembly.

The trim assembly comprises a trim piston, a trim cylinder providing first and second trim chambers one on each side of the trim piston, and a trim fluid system for providing a flow of fluid to and from each of the trim chambers. The trim fluid system includes trim conduits, a fluid accumulator and a remotely actuated trim valve for controlling trim fluid flow. The trim valve is operable between a closed position for preventing the fluid flow to hold the trim piston in a locked position, and an open position for allowing the piston to move to a new locked position in the trim cylinder. Movement of the trim piston causes fluid flow to one of the trim chambers and fluid flow from the other of the trim chambers. This fluid flow permits the length of the linkage assembly to change relatively freely in response to steering forces, which in turn permits the steerable wheels to move freely to a new center position in response to an applied steering force.

The resistance assembly includes a component that moves with the steering system in response to steering wheel movement, and resistance to movement of this component provides a resistance force opposing movements of the steerable wheels to either side of their center position. These movements include large radius turns that occur when a vehicle is steered through maneuvers at highway speeds and small radius turns that occur when a vehicle turns a corner. During large radius turns, the resistance assembly provides a resistance force that biases the steerable wheels back toward their center position, and this bias serves as a return force to return the steerable wheels to their center position upon removal of the steering force producing the large radius turn.

More specifically, the resistance assembly comprises a resistance piston means, a resistance cylinder providing first and second resistance chambers one on each side of the resistance piston means, and a resistance fluid system for providing a flow of fluid to and from each of the resistance chambers. The resistance fluid system includes resistance conduits and a fluid accumulator. The accumulator may be the same as or separate from the trim accumulator. In the latter alternative, a separate resistance accumulator forms a dual accumulator assembly with the trim accumulator. The term "conduit" is used in this specification as a generic term to refer collectively to lines, pipes, tubes, hoses, passages, passageways, ports and/or the like for conveying and/or communicating a fluid.

In several of the embodiments described herein, a separate resistance accumulator is arranged concentrically around the trim accumulator and both are housed in the same casing. The concentric resistance accumulator may be operated at a higher pressure than the inner trim accumulator, and the latter is preferably pressurized by providing a fluid flow path from the former to the latter through a pressure regulator. In these embodiments, the remotely actuated trim valve of the trim assembly is located either internally within an intermediate head between the trim assembly and the resistance assembly, or alternatively within the separate trim accumulator. In a further embodiment, the trim and resistance assemblies use a single joint accumulator, and the remotely actuated trim valve is located in this joint accumulator.

During small radius turns, the resistance assembly may be rendered ineffective by the trim assembly to permit easy away from center movements during such turns. This is accomplished by causing the trim valve to open, which in turn allows movement of the trim piston away from its locked position in response to the steering force applied to produce the small radius turn. For this purpose, the control system includes a remote switch for turning a solenoid actuator of the trim operating system on and off remotely from the driver's station of the vehicle. When the remote switch is in its ON position to activate the solenoid actuator, the trim valve is opened so that no resistance force is applied to the steering system by the linkage assembly because the trim piston is not "locked" and is therefore free to move away from its previously locked position in the trim cylinder. Operation of the same remote switch to its ON position during normal straight ahead travel of the vehicle also allows the centered position being maintained by the invention to be changed, i.e., "trimmed", during vehicle operation.

Internal passages and/or orifices in an intermediate head lbetween the trim cylinder and the resistance cylinder may be sized to provide a dampening action sufficient to prevent overly rapid movements of the trim piston away from its previously locked position, such as might otherwise occur during the blowout of a tire on a steerable wheel while the trim valve assembly is open. Similar internal passages and/or orifices in an intermediate head also may be sized to provide a dampening action sufficient to prevent overly rapid movements of the resistance piston away from its centering position. The invention may thus provide a relatively high degree of protection against a loss of vehicle steering control due to tire blowouts or other accidental impacts to a steerable wheel.

The stabilizer includes means for remotely and selectively varying both the amount of resistance to movement away from center and the preselected position of the steerable member relative to the vehicle frame. Both of these remote adjustments can be made by the driver while the vehicle is in operation. A "manual" control system may be employed that uses a manually operated remote switch for actuating the trim solenoid and a manually adjustable pressure regulator for varying both the trim system and resistance system pressures. For this alternative, the manual solenoid switch, an air pressure gauge and a manual regulator dial are preferably located at the driver's station of the vehicle.

The level of resistance to movement away from center may be remotely adjusted either by such a manual control system operable by the driver or by a microprocessor control system responsive to the speed of the vehicle. Thus, the turning resistance of the present invention is readily adjustable to provide a low level at low speeds and a high level at speeds of about 35 mph or greater. In this regard, the steering stabilizer of the present invention is much less complex than prior art arrangements, such as those which combine high positive caster near the center position and complex power steering systems for varying the level of power assist from a low assist level for large radius turns to a high assist level for small radius turns.

The centering return force provided by positive wheel caster follows a force curve that may provide relatively little, if any, turning resistance in the straight ahead position or for large radius turns immediately adjacent to the straight ahead position. The resistance pistons may be sized to provide a resistance force which blends with any return force provided by the normal geometry of the front end of a motor vehicle. The invention can increase substantially the turning resistance available at and immediately adjacent to either side of the straight ahead position of the steerable wheels. The turning resistance provided by the invention at or near the centered wheel position should be sufficiently large to resist spurious steering inputs generated either by the driver or by an overactive power steering system.

In a preferred embodiment, the piston sizes and other stabilizer parameters are chosen so that a total break away steering force of at least 50 pounds, preferably at least 100 pounds, and more preferably at least 200 pounds for automobiles or light trucks and 300 pounds for heavier vehicles such as motor homes and 18 wheel trucks, must be applied to the tie rod in order to initiate break away turning movement of the steerable wheels at vehicle speeds above about 35 miles per hour. For city driving at vehicle speeds of about 35 miles per hour or less, the break away force required may be lowered to about 100 pounds, more preferably below about 50 pounds, at the tie rod.

At greater turning angles (small radius turns), the resistance force provided by the invention may be nullified as positive caster return force increases. Thus, where the steerable wheels are provided with a generous amount of positive caster as the turning angle increases, which is often the case with highway motor vehicles, it may be desirable to activate the solenoid actuator of the trim valve and thereby release the trim piston so that no further turning resistance is provided by the resistance piston, at least over a predetermined range of turning angles such as, for example, greater than 3 degrees to either side of center. However, in some applications where there is little or no positive caster, the resistance force need not be nullified, but instead the resistance piston and cylinder may be sized to provide a resistance force effective over the entire range of turning angles, which for highway vehicles is usually limited to 45 degrees on either side of the straight ahead position (the "0" position). Thus, depending on the amount of positive caster, the resistance force may be desirable over a range of 0–45 degrees or 0–10 degrees or 0–5 degrees or 0–3 degrees on either side of center, these being only a few examples.

The stabilizer is preferably connected between the steering system and the front axle or a nearby frame member of the vehicle in a position that allows the steerable member(s) to move through its full range of steering movements while providing sufficient leverage for the apparatus to resist movement of the steerable member away from the center position producing straight ahead travel of the vehicle. The steering system connection may be made to any steering system component providing appropriate range and leverage, such as a tie rod which joins the two front steerable wheels of a highway vehicle, or the pitman arm connected to the reduction gear. The frame connection may be made to any component serving as a fixed mounting relative to the steering system.

The invention may be used with steering systems having a reduction gear between the steering wheel and the steerable wheels. In this application, the stabilizer is preferably connected to the steering system at a location between the steerable wheels and the reduction gear so as to be unaffected by any slack in the reduction gear or in components and connections between the reduction gear and the steering wheel. It is therefore on the slow side of the reduction gear ratio. The invention thus provides a zero backlash center stabilizer assembly.

The level of steering force required to initiate or breakaway into a steering movement away from center is sometimes referred to in this specification as the "break away resistance". Different levels of break away resistance and of resistance force may be appropriate to compensate for changes in the forces acting upon the vehicle. Thus, the resistance force provided by the invention may be increased or decreased to provide a level of force sufficient to overcome any spurious steering inputs and to suit driver road feel, particularly a feel of the steering wheel that lets the driver know when the steered wheels are beginning to move away from center and are closely approaching return to center. In other words, the invention provides a distinctive feel when approaching or leaving the center position. Thus, the sense of touch is added to the visual sense to aid control of the vehicle and reduce driver fatigue.

In the absence of the invention, spurious inputs to and/or mechanical slack in the steering assembly require almost constant manipulation of the steering wheel by the driver and make it almost impossible for the driver to hold the vehicle on a true straight ahead course. Use of the invention therefore permits a substantial reduction or elimination of the caster angle of vehicles with positive caster, thereby significantly reducing the crosswind effect and providing the driver with a positive touch control not heretofore attainable with positive caster. Positive stability is thereby achieved for previously unstable steering systems. In addition, less manipulation of the steering system provides a substantial reduction in tire wear, particularly for large vehicles. It is estimated that use of the invention on large trucks in the United States alone may reduce tire replacement costs by as much as 3 billion dollars over a five year period.

Although the present invention is particularly useful as a center stabilizer assembly for motor vehicles, it can be employed to hold the center position of any steerable member moveable to either side of a preselected position. For example, the stabilizer can keep an outboard motor centered so that a boat follows a straight course over the water in the presence of spurious steering forces produced by wind and wave action. The stabilizer can also be used to keep centered such steerable members as the rudders of ships or airplanes and the tongues of tandem trailers or railway cars. The stabilizer is useable with both power and non-powered steering systems, with the level of resistance forces provided usually being less for vehicles without power steering.

BRIEF DESCRIPTION OF THE DRAWINGS

The invention, both as to its structure and operation, may be further understood by reference to the detailed description below taken in conjunction with the accompanying drawings in which:

FIG. 2 is a schematic diagram of the fluid and electrical systems and of the major components of the invention, and includes sectional views showing structural details of the steering trim assembly, the turning resistance assembly and the valved accumulator assembly;

FIG. 4 is an enlarged transverse sectional view of the trim valve section of the trim cylinder assembly taken along line 4—4 of FIG. 2;

FIG. 5 is a fragmentary sectional view of the trim valve section taken along line 5—5 of FIG. 4;

FIG. 6 is a fragmentary sectional view of the trim valve section similar to FIG. 5, but with the valve in its open position FIG. 7 a fragmentary sectional view of the solenoid operated air valve 109 in FIG. 2;

FIG. 8 is a schematic diagram of the fluid and electrical systems and of the major components of a modification of the invention, and includes sectional views showing structural details of the steering trim assembly, the turning resistance assembly and the valved accumulator assembly;

FIG. 9 is a schematic diagram of the fluid and electrical systems and of the major components of another modification of the invention, and includes sectional views showing structural details of the steering trim assembly, the turning resistance assembly and the valved accumulator assembly;

FIG. 12 is a schematic diagram of the fluid and electrical systems and of the major components of a further modification of the invention, and includes sectional views showing structural details of the steering trim assembly, the turning resistance assembly and the valved accumulator assembly;

FIG. 13 is top sectional view of the valved accumulator assembly taken along line 13—13 of FIG. 12; and, FIG. 14 is an enlarged sectional view of the valved accumulator assembly taken along line 14—14 of FIG. 13.

DETAILED DESCRIPTION OF THE INVENTION

Figure 1:
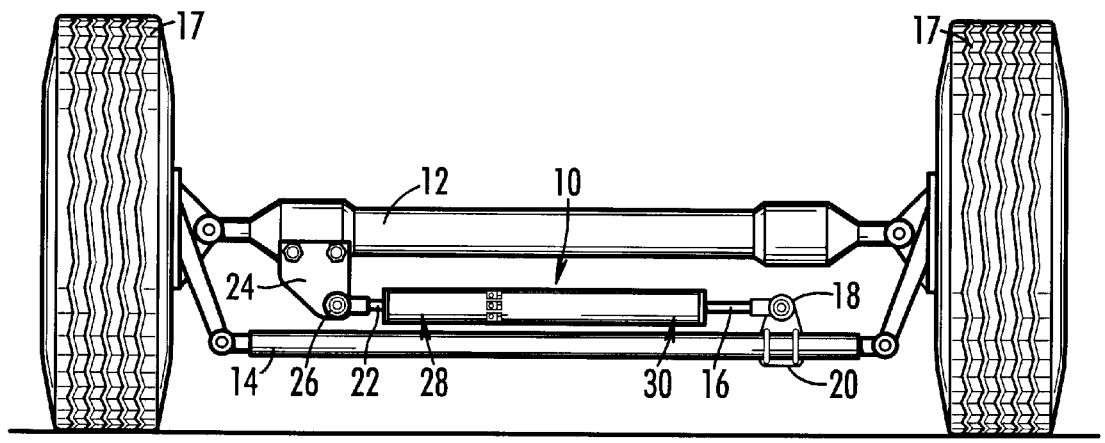
FIG. 1 is a plan view illustrating installation of the invention between the frame and steering system of a motor vehicle.
Figure 3:
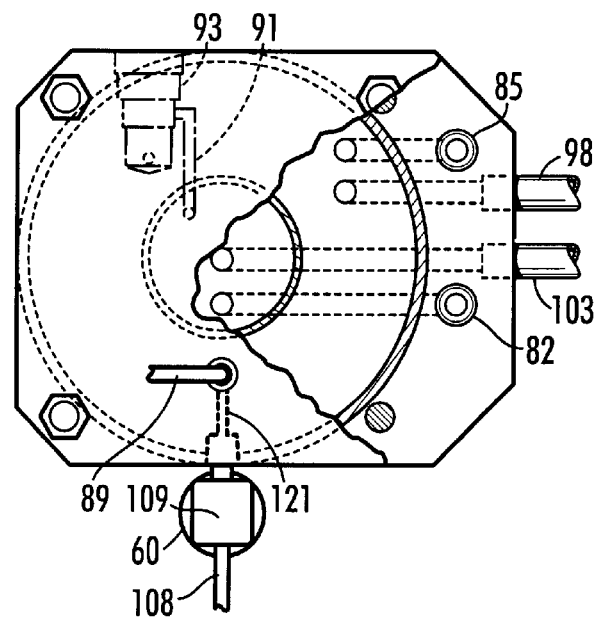
FIG. 3 is top partial sectional view of the valved accumulator assembly of the invention.

The steering stabilizer of the present invention comprises a linkage assembly, generally designated 10, which may be connected between a front axle or frame member 12 and the tie rod 14 of a conventional motor vehicle as shown in FIG. 1 of the drawings. Steering inputs by the driver are transmitted to the tie rod 14 and the steerable wheels 17,17 by the pitman arm (not shown) of the vehicle's steering gear. The outer end of a resistance rod 16 of linkage assembly 10 is connected to the tie rod 14 by means of a ball joint 18 connected between the outer rod end and tie rod 14 by a bracket 20.

The outer end of a trim rod 22 at the opposite end of linkage assembly 10 is connected to the axle 12 by means of a ball joint 26 connected between the outer rod end and axle 12 by a bracket 24. The ball joints 18 and 26 permit pivotal movement in the horizontal plane and to a limited extent in the vertical plane, and are conventional joints wherein an enlarged spherical ball is mounted by a stub on the corresponding bracket and is held for pivotable movement within a surrounding journal structure carried by the corresponding rod end.

The components of the stabilizer system and the way in which they hold center during vehicular travel, and return a vehicle steering system to center after turning of the vehicle, will now be described. It is to be understood that the components described are connected together by appropriately sized fluid conduits and electrical wires and that these conduits and wires are represented by the lines interconnecting the components as shown in the drawings.

Referring now to FIGS. 1 and 2, the linkage 10 includes a trim assembly 28 and a resistance assembly 30. Trim assembly 28 comprises a trim cylinder housing 32 enclosing an interior cylinder 33, which is divided into two chambers 34 and 35 by a trim piston 36 secured to the inner end of trim rod 22. The outer ends of housing 32 and cylinder 33 are closed by a head 40 having a journaled and sealed aperture 41 for sliding passage of trim rod 22. A set of multiple seals 42 and the head 40 are secured in place by being threaded into or crimped onto the cylinder housing 32. The end portion of trim rod 22 projecting beyond cylinder housing 32 may be surrounded by a dirt and grease barrier in the form of a flexible boot, such as boot 48 in FIG. 8.

The inner end of cylinder 33 is closed by an intermediate head 50, in which may be included an air operated trim valve assembly, generally designated 52, which is described below. The side of intermediate head 50 opposite to trim cylinder 33 closes a resistance cylinder housing 53. The end of cylinder housing 53 opposite to head 50 is closed by an end head 54 to provide a pair of resistance chambers 55 and 56 on opposite sides of a resistance piston means, generally designated 57.

An accumulator assembly, generally designated 75, includes an inner low pressure section 76 defined by an inner cylindrical wall 77 and an outer annular high pressure section 78 defined by an outer cylindrical wall 79, the walls 77 and 79 being secured between a cover 80 and a base 81. The inner section is filled with a liquid through a fill tube 82 to create a low pressure gas chamber 83 and a trim liquid reservoir 84, and the outer section is filled with a liquid through a fill tube 85 to create an annular high pressure gas chamber 86 and an annular resistance liquid reservoir 87. The chamber 86 is connected to a high pressure gas supply 88 via a gas line 89 and a port 90 in cover 80. An alternative to gas line 89 is the gas line 167 and its associated variable pressure system as shown in FIG. 8 and described in detail below. The low pressure chamber 83 is connected to the high pressure chamber 86 via a cover passage 91 and a pressure regulator 93 located in the passage 91 for reducing the gas pressure from that desired in chamber 86 to that desired in chamber 83.

The high pressure chamber 86 is connected via a base passage 96, a base port 97, a line 98 and a head port 202 to a passage 99 (FIG. 5) in intermediate head 50, and head passage 99 in turn is connected to resistance chambers 55 and 56 via a port 156 leading to chamber 56 and an arcuate passage 153 and a port 154 leading to chamber 55. The low pressure chamber 83 is connected via a base passage 101, a base port 102, a line 103 and a head port 208 to a passage 104 in intermediate head 50, and head passage 104 in turn is connected to a valve chamber 106 on one side of a valve member 112. Valve chamber 106 in turn is connected to trim chamber 34 via a port in the form of a valve seat 100, a head passage 107 and an annular passage 69 that is defined by the housing 32 and the trim cylinder 33 and leads to a chamber port 70. The valve chamber 106 is also connected to trim chamber 35 via a port in the form of a valve seat 105, a head passage 110 and a chamber port 73.

Referring now to FIG. 6, valve member 112 has an integral piston portion 114, and chamber 106, member 112 and piston 114 are part of the trim valve assembly 52. Although in this embodiment piston 114 is formed integrally with valve member 112, the piston may be a separate element connected to the valve member by a shaft, rod or the like. Operation of the piston 114 and thereby valve member 112 is controlled by a solenoid actuated air valve 109 that is in a high pressure air line 108 connected to a pressure chamber 119. The valve seats 100 and 105 are opened and closed by the valve member 112 that is actuated to its closed position by high pressure air fed to the pressure chamber 119 through the line 108, a head port 252, a head passage 111 and a passage 113 in a valve chamber cap 131 during activation of a solenoid 60 of air valve 109 in response to the ON position of a remote electrical switch 62 of an electrical control system. Valve 109 is normally held open by its solenoid and is closed only momentarily by deactivating its solenoid to briefly open the main valve seats 100 and 105 for making a trimming adjustment as described below.

Although switch 62 may be hard wired to the solenoid, it is preferable a remote switch that may be mounted on the steering wheel 38 of a motor vehicle for generating a radio signal to activate the solenoid 60 via a radio signal receiver 117. The ON position of switch 62 activates a signal generating unit 118 that in turn activates the signal receiver 117 causing it to supply an electrical current from a power source 63 to the valve solenoid 60. With this option, the switch 65 of a relay 64 does not close until the receiver section 117 receives an ON signal from the remote unit 118. On the other hand, switch 65 opens in the absence of a signal from unit 118 when switch 62 is in its OFF position for trimming the steering system. The signal generator and receiver are of conventional design and allow the driver of the vehicle to conveniently change (trim) the centered position of the steering system as desired.

The solenoid operated valve 109 is secured to the accumulator cover 80 by an adapter 58 leading to a cover passage 121 connected to a cover passage 115 connecting the high pressure air source to the accumulator chamber 86. As may be seen in FIG. 7, internal to the solenoid is a double ended plunger 59 having at its upper end a valve element 125 that, when switch 62 is ON to activate the solenoid, is moved downward by the solenoid away from a valve seat 120 to open valve 109. In other words, when the solenoid 60 of air valve 109 is actuated by an electric current supplied thereto by the radio receiver 117 in response to the electrical switch 62 being in its ON position, the plunger 59 compresses spring 61 and causes valve element 125 to open valve seat 120. A differential between high and low pressure air will then act on the trim valve piston 114 and force the trim valve member 112 to close the trim valve seats 100 and 105.

In the absence of electrical power to the solenoid 60, i.e., when the switch 62 is in its OFF position, the solenoid plunger 59 is pushed upward by the compressed return spring 61 so that valve element 125 closes the valve seat 120 and thereby the flow path for pressurized air to reach the valve piston 114. When valve seat 120 is closed, the chamber 119 adjacent the piston 114 is vented to the atmosphere via an adapter and solenoid passage 122 and a vent passage 123 through solenoid 60. The venting of chamber 119 allows the differential between trim system pressure and ambient, which may be aided by a compression spring 94, to open the valve seats 100 and 105 by pushing away therefrom the valve member 112. The trim valve assembly 52 is thereby actuated to its open position. When valve seat 120 is reopened to actuate the valve assembly 52 to its closed position, the vent passage 123 is closed by a valve element 126 at the lower end of solenoid plunger 59.

To insure that there is no fluid communication from the high pressure section to the low pressure section and vice versa, a bellofram diaphragm 129 extends completely over and seals the high pressure side or actuating surface of the valve piston 114 (FIGS. 5 and 6). The diaphragm 129 has a rib 130 around its outer edge and is held in place by clamping this rib in an annular groove 127 between the intermediate head 50 and the chamber cap 131 providing the closure for the pressure chamber 119. The diaphragm also includes an annular loop segment 132 that permits reciprocation of the valve piston while maintaining the desired seal between the valve piston 114 and the air passage 113 in cap 131, passage 113 communicating with head passage 111 as shown in FIG. 6. An annular U-cup seal 133 around the valve piston 114 insures that there is no fluid communication from the valve chamber 106 to the piston side of the diaphragm 129 when the pressure chamber 119 is opened to the vent passage 123. An air breather vent 19 insures that the space between the seal 133 and the diaphragm 129 remains open to ambient pressure. Appropriate O-ring seals, as represented by small black or cross-hatched circles in the drawings, are provided between the various components of the invention across which there may be a pressure differential.

When trim valve assembly 52 is in its open position with solenoid 60 deactivated (valve seat 120 closed and valves seats 100 and 105 open), a fluid, preferably a liquid, is supplied from the trim reservoir 84 to the trim chambers 34 and 35. Therefore piston 36 is relatively free to move back and forth in trim chambers 34 and 35 away from its last locked position C1, in which piston 36 was "locked" when trim valve assembly 52 was last closed (valve seat 120 open and valve seats 100 and 105 closed). The availability of an accumulator reservoir, such as trim reservoir 84, is required even though the fluid may flow back and forth between trim chambers 34 and 35 via the interconnecting passages when trim valve assembly 52 is open. This is because of the volume of chamber 34 taken up by the presence of trim rod 22, which makes the volume change in chamber 34 caused by the movement of piston 36 different from the volume change in chamber 35 caused by such movement.

Also shown in FIGS. 1 and 2 is the resistance assembly 30 having a cylinder means containing a piston means 57 comprising a dual piston arrangement. Although a single piston arrangement is possible, this would require a more complicated valving arrangement. The resistance cylinder housing 53 encloses two separate interior cylinders 150 and 151, the adjacent ends of which are connected together by a collar 152. The cylinders 150 and 151 contain resistance pistons 142 and 144, respectively, and these components together define respective centering or resistance chambers 55 and 56. An enlarged rod head 140 is keyed and fastened to the inner end of a resistance rod 16. Head 140 is positioned between opposing faces of pistons 142 and 144 and serves as the actuator for these pistons.

A breather port 147 is provided in collar 152 and vents to ambient to allow air to enter and leave the space S between pistons 142 and 144 as they reciprocate in cylinders 150 and 151. Alternatively, the space S may vent to ambient via a breather line or to a vent reservoir (not shown). The end portion of resistance rod 16 projecting beyond cylinder end head 54 is connected to the mounting bracket 20 by the conventional ball joint 18, and also may be surrounded by a dirt and grease barrier in the form of a flexible bellows similar to bellows 48 shown for trim rod 22 in FIG. 8.

The end of cylinder 150 opposite to collar 152 is closed by a head 54 having a journaled and sealed aperture 49 for sliding passage of resistance rod 16. A set of multiple seals 51 and a journal 146 are secured in place by a snap ring 48, and the end head 54 is threaded into or crimped onto the cylinder housing 53. Piston 142 has a sealed aperture 69 for sliding passage of rod 16 during its movement of piston 144. A piston rod seal 71 and a journal 70 are secured in piston 142 by a snap ring 71. The end of cylinder 151 opposite to collar 152 is closed by the adjacent side of the intermediate head 50, and the two cylinders 150 and 151 are secured to the collar 152 and the opposite respective closures by crimping at positions beyond seal rings 44, 45, 46 and 47.

Pistons 142 and 144 are shown in FIG. 2 in their rest positions corresponding to a centered steering system. These rest positions are shown offset toward the intermediate head 50 (to the left in FIGS. 2 and 9) in order to equalize the volumetric capacity of chambers 55 and 56 since chamber 55 also contains a portion of rod 16. Both pistons are arranged for compressive movement toward the opposite ends of their respective chambers, piston 142 traveling in chamber 55 and piston 144 traveling in chamber 56 within cylinders 150 and 151, respectively. A compressive movement of piston 142 to the right is shown in FIG. 8 by way of example.

The rest or retracted position of each piston is defined by the internal annular collar 152 which serves as a piston stop and preferably has an axial width substantially equal (preferably within one-ten thousandth of an inch) to the axial thickness of rod head 140. A stop width greater than the head thickness is undesirable because gaps between opposing surfaces would allow unbiased movement (slack) between rod 16 and cylinders 150 and 151. A stop width less than the head thickness is also undesirable because this would let fluid flow back and forth between chambers 55 and 56 through the connecting arcuate passage 153 so that the pistons 142 and 144 would move in tandem together (drift) until one of them bottoms out against the collar 152, there being no centering bias applied to the rod head during such joint piston movement.

Therefore, the high pressure section 78 of accumulator assembly 75 constantly biases the resistance pistons 142 and 144 into substantially simultaneous engagement with both the stop collar 152 and the piston rod head 140 at all times while the resistance assembly is pressurized and in its centering position, such that there is no significant slack or drift at any time during its operation. Near the end of each centering chamber opposite to the retracted piston position is a port for communicating fluid pressure to the chamber, port 154 serving chamber 55 and port 156 serving chamber 56. Ports 154 and 156 are connected together by the arcuate passage 153, which includes a collar passage 148, so that both ports communicate with chamber 56, which in turn is connected via head passage 99 and conduit 98 to accumulator high pressure chamber 86.

The vehicle steering system is properly centered when pistons 142 and 144 abut collar 152. In order to move or break away from collar 152, these pistons must overcome the resistance provided by accumulator pressure acting through the conduit 98, which may contain an in-line filter (not shown). A preferred feature of the fluid resistance assembly 30 is the difference in diameters between piston 142 and its cylinder 150 on the one hand and piston 144 and its cylinder 151 on the other hand, the diameter of piston 142 and cylinder 150 being larger by an amount sufficient to produce equal resistance forces on pistons 142 and 144 in spite of the area of piston 142 lost because the resistance rod 16 passes through aperture 69 in piston 142. Thus, to provide equal working areas, the cross-sectional area of cylinder 150 may be greater than the cross-sectional area of cylinder 151 by an amount sufficient for the annular surface area of piston 142 to be equal to the disk surface area of piston 144, the difference in the cylinder cross-sectional areas being equal to the amount of piston area lost by reason of rod aperture 69 in piston 142. However, for reasons of simplicity and economy of manufacture, the diameters of the resistance pistons and cylinders may be equal, as illustrated in FIG. 12, where the difference in resistance forces on pistons 142 and 144 does not significantly affect performance or the feel of the steering wheel when turning away from center.

Although a gas such as air could be used for the resistance fluid in chambers 55 and 56, a liquid resistance fluid is preferred because it is substantially incompressible as compared to a gaseous fluid, and therefore provides the capability of a viscous dampening action as the liquid flows through a restricted passage, such as that provided by the passage 99 in head 50, which may be sized to function as an orifice. Another important feature of the invention is that viscous dampening action may be provided by including orifices in or adjacent to the trim valve seats 100 and 105 so that this action will be provided by movement of the trim piston in the trim chambers 34 and 35 when the trim valve 52 is in its open position because solenoid 60 is deactivated, such as for making small radius turning maneuvers.

In this regard, the length of trim cylinder 33 may be such that the full stroke of trim piston 36 is available for most or all small radius turns. The smallest radius turn is defined as turning the steerable wheels from "lock to lock", which is usually equivalent to a turning angle of about a 45 degree to either side of center, i.e., movement of the wheels through about 90 degrees in going from a full right turn to a full left turn or vice versa. For many practicable applications, the stroke of the trim piston preferably provides turning angles of at least about 15 degrees, more preferable at least about 25 degrees, and most preferable at least about 35 degrees.

The gas trapped in high pressure gas chamber 86 provides a spring-like return force and this chamber may be sized such that the return force does not vary significantly with compressive movement of pistons 142 and 144. The resistance reservoir 87 of accumulator assembly 75 should be large enough to receive the entire volume of liquid from either chamber 55 or 56 without unduly compressing the gas in chamber 86. The associated fill tube, which is normally closed by a cap (not shown), allows liquid reservoir 87 to be filled with hydraulic fluid up to the desired level as determined by the height of the fill tube.

Gas pressure in chamber 86 acts against the liquid surface to store fluid energy received from the hydraulic side of the system, and to maintain fluid pressure on the liquid side of the respective pistons 142 and 144. Because of the stroke available from the trim piston when the trim valve is off, there is no need for the gas pressure to be released to ambient atmosphere to easily execute small radius turns without any turning resistance from the invention. However, a pressure relief valve (not shown) may be provided in communication with the high pressure gas chamber of the accumulator to insure an upper limit to the resistance and return forces that may be generated by compressive contact of the piston rod head with one or the other of the resistance pistons.

Accumulator assembly 75 allows hydraulic pressure in the resistance or centering chambers 55 and 56 to be precisely set at a selected value within a relatively wide range. Both gas chambers 83 and 86 are pressurizable to a selected pressure determined by the amount of gas pressure available from the gas source 88, and by the setting of the pressure regulator 93. The gas source 88 may be an air compressor system for air brakes or just an air tank with a pressure gauge and a Schraeder valve or some other type of tire valve (not shown). A Schraeder valve or the like acts like a check valve to introduce and retain the desired amount of air in a closed space and may also be actuated to release air in the same manner as when it is used as a vehicle tire valve.

A gas pressure control may be provided and this may simply comprise a needle valve (not shown) in line 89 in combination with a downstream pressure gauge to indicate accumulator pressure in chamber 86. Alternatively, a pressure regulator may be used for maintaining a manually or automatically selected gas pressure in accumulator assembly 75, such as described below in connection with FIG. 8. By varying the gas pressure in gas chamber 86 through adjusting the pressure, the break away resistance and the centering return force produced by the pistons 142 and 144 can be increased or decreased as desired. The range of pressures available in chamber 86 should be selected so that the break away resistance can be maintained at a relatively high level for centering the steerable wheels when the vehicle is travelling at highway speeds.

For lighter vehicles, such as automobiles and pickup trucks, the accumulator pressure and other stabilizer parameters may be chosen so that a linear break away steering force of at least about 30 pounds, preferably at least about 50 pounds, more preferably at least about 100 pounds, and most preferably at least about 150 pounds, must be applied to the tie rod by the pitman arm in order to initiate a break away turning movement of the steerable wheels. For heavier vehicles, such as eighteen wheel trucks and motor homes, these parameters may be chosen to require a linear break away steering force of at least about 200 pounds, preferably at least about 300 pounds, and more preferably at least about 300 pounds to 400 pounds.

To achieve such break away forces at the tie rod for large radius turns at highway speeds, the gas pressure in chamber 86 is preferably in the range of about 100 to about 300 psig, and more preferably about 150 to about 200 psig. The turning forces applied to the vehicle steering system are thus opposed by equal turning resistances provided by the stabilizer, and these resistance forces should be maintained for at least small turning angles away from center, preferably 0°–5°, more preferably 0°–3°, and most preferably within one degree on either side of center. Small turning angles correspond to large radius turning maneuvers.

After linear movement of the rod head 40 is initiated upon breakaway, the steering force required to sustain movement is a function of the pressure in the accumulator, as well as of other centering phenomena acting on the steering system, such as positive wheel caster. Also after breakaway, accumulator pressure acting on the off-center piston may provide a return force that is effective over the entire range of turning angles, which for highway vehicles is usually limited to about 45° on either side of the center wheel position (the 0° position).

The operation of the trim assembly 28 and the resistance assembly 30 will now be described in more detail. When the steerable wheel or member of a vehicle is turned to either side of its center position, either by a steering force transmitted from the steering wheel 38 or other steerable member or by spurious steering forces transmitted to the steerable member by a roadway or the like, this steering movement is resisted by the resistance assembly 30 of the linkage assembly 10. Until the steering force exceeds the compression preload provided by the air pressure in high pressure chamber 86, there will be no movement of the steerable member.

After the compression preload is exceeded, turning movements are permitted within the range provided by the stroke of piston 142 in chamber 55 and the stroke of piston 144 in chamber 56 by application of sufficient steering force such as, for example, up to a steering force of about 350 lbs. as applied to the tie rod 14. This maximum steering force is opposed by an equal amount of resistance force provided by the gas pressure in chamber 86, which biases the ball joint 18 and the entire steering system back toward their center positions. Small turning movements requiring a relatively high steering force are sufficient for maneuvering a motor vehicle at highway speeds, and the resistance force bias readily returns the steering system to center after such maneuvers, which also may be referred to as large radius turns.

Referring now to FIG. 8, there is shown a modification of the invention wherein the air actuated trim valve 52 has been replaced by a solenoid actuated trim valve 52' having a valve member 43 that is pushed into its closed position by an actuating member 59' during activation of a solenoid 60' and is returned to its open position in a chamber 217 by a compression spring 61' upon deactivation of the solenoid. Since the components of the accumulator, trim and resistance assemblies are essentially the same as for the embodiment of FIG. 2, except for a modified intermediate head 50', a slightly modified cover 80' of accumulator 75' and a modified trim valve 52', the same numerical designations have been used for the essentially same components.

In this modified embodiment, the resistance chamber 56 is connected to the high pressure reservoir 87 via the line 103 and a passage 195 containing an orifice 67, which provides the dampening function for blowout protection as previously described. The control assembly of this embodiment includes a control panel 189 located in or near the driver's station of a vehicle and having an ON/OFF switch 155 provided with electrical power through a fuse panel 156. Panel 189 also includes a high pressure air gauge 176, a trim button 188 for momentarily interrupting electrical power to solenoid 60', and a pressure regulator 169 with a manual adjustment knob 173.

The trimming function of this embodiment operates as follows. The interrupting of electrical power to the solenoid 60' in response to momentarily opening switch 188 or cutting off switch 155 on the control panel 189 causes retraction of the valve member 43 into the chamber 217, thereby placing trim valve 52' in its open position. To insure free reciprocating movement of valve member 43, chamber 217 is vented through a valve member passage 218. When trim valve 52' is in its open position, fluid is free to flow back and forth through the internal passages in the modified intermediate head 50' as previously described for the intermediate head 50 of FIG. 2.

For example, with trim valve 52' open (member 43 pushed upward by spring 61'), trim piston 36 is free to move toward the right in FIG. 8, thereby causing fluid to flow from trim chamber 35 into trim chamber 34 through chamber port 73, passages 72 and 71, valve seat ports 39 and 37, passages 68 and 69, and chamber port 70; and also into low pressure reservoir 84 through chamber port 73, passages 72 and 71, valve seat port 39, passages 66 and 74, fitting 143, and line 98. On the other hand, movement of piston 36 to the left in FIG. 8 causes fluid to flow from trim chamber 34 into trim chamber 35 via chamber port 70, passages 69 and 68, valve seat ports 37 and 39, passages 71 and 72, and chamber port 73; and also into low pressure reservoir 84 via chamber port 70, passages 69 and 68, valve seat port 37, passages 66 and 74, fitting 143, and line 98. However, in this instance, there may be relatively little or no flow into reservoir 84 because the volume of chamber 35 will increase more rapidly than the volume of chamber 34 will decrease, due to the presence of trim rod 16 in chamber 34.

Accumulator assemblies 75, 75', 175 and 275 allow hydraulic pressure in the centering chambers 55 and 56 to be precisely varied over a relatively wide range because this hydraulic pressure depends directly on the level of pressurization of the respective gas chambers 86, 186 and 286. For brevity, only the variable pressure control system for the embodiment of FIG. 8 will be described here, with the understanding that this control system is equally applicable to the embodiments of FIGS. 2, 9 and 12.

The gas pressure control may comprise a manual throttle valve (not shown) between conduits 170 and 167, in combination with the pressure gauge 176 to indicate the air pressure in chamber 86. Alternately, the pressure regulator 169 may be used for maintaining a manually selected system pressure. The control knob 173 is provided to permit varying the pressure settings of the regulator by hand. By varying the gas pressure in gas chamber 86 through adjusting pressure regulator 169, the break away resistance and the centering return force produced by the compensator of the invention can be increased or decreased as desired. The range of pressures available should be selected so that break away resistance can be varied from relatively low at low speeds to relatively high at high speeds.

As an alternative to manual adjustment, the output pressure of regulator 169 may be adjusted by a reversible electric motor (not shown) controlled by an on-board computer 160, which comprises a microprocessor 161, an encoder 162 and a decoder 163. Encoder 162 converts to digital signals an analog signal 164 input from a pressure sensor 165 in the gas supply conduit 167, an analog signal 168 input from a vehicle speed sensor 171, and an analog signal 172 input from a position sensor (not shown) within regulator 169. Decoder 163 converts digital control signals generated by microprocessor 161 to an analog signal 174 for controlling the reversible electric motor which adjusts the output pressure provided by regulator 169. The gas pressure in high pressure gas chamber 86 and the resulting resistance and centering forces are thereby made automatically responsive to the speed of the vehicle to provide "speed sensitive centering" of the vehicle's steering system. It may be desirable that the resistance to turning movements away from the center position be increased automatically as the speed of the vehicle increases because the effects of small off-center movements in response to spurious steering inputs increase dramatically with vehicle speed.

Athough the piston 36 is relatively free to move back and forth in the chambers 34 and 35 when trim valve assembly 52' is open, it is preferable that the internal passages in intermediate head 50' be sized to provide a dampening action sufficient to prevent overly rapid movements of the steerable member away from its previously locked position, such as might otherwise occur during the blowout of a tire on a steerable wheel while the trim valve assembly 52' is open. The invention may thus provide a relatively high degree of protection against a loss of vehicle steering control due to tire blowouts or other accidental impacts to a steerable wheel. As a safety feature and to provide such dampening action when trim valve assembly 52' is closed, a pressure relief valve R1 may be provided in the passage 74 to relieve any overpressure in trim chamber 35 and a similar pressure relief valve R2 may be provided in trim piston 36 to relieve any overpressure in trim chamber 34.

As it may be desirable to completely deactivate stabilizer 10 in the event of a failure of a power steering system, a switch 159 for interrupting electrical power to a solenoid actuated air dump valve 158 between an adapter 205 and the air supply line 170 may be provided for vehicles with power steering systems. Switch 159 is mounted on a pressure sensor 157 located in a hydraulic line 51 in fluid communication with the outlet of the power steering pump (not shown). A loss of pressure at the pump outlet causes switch 159 to open, thereby causing gas dump valve 158 to open for depressurizing gas chambers 86 and 83, which in turn depressurizes liquid reservoirs 87 and 84, resistance chambers 55 and 56 and trim chambers 34 and 35. Dump valve 158 is preferably a three-way valve that shuts off the passage in adapter 205 when it opens line 170 to ambient via a vent line 211. Valve 158 and vent line 211 are preferably of larger capacity than gas supply conduit 170 and adapter 205 combined to ensure rapid depressurization of chambers 83 and 86 upon the opening of pressure switch 159, even if the air passage through the adapter is not completely shut off.

Figure 10:
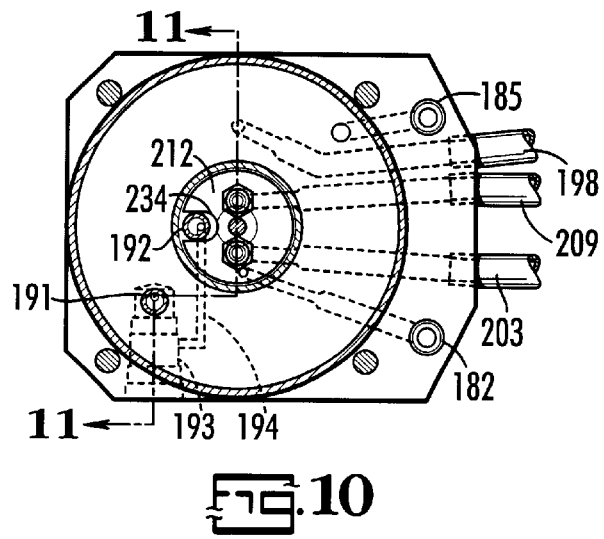
FIG. 10 is top sectional view of the valved accumulator assembly taken along line 10—10 of FIG. 9.
Figure 11:
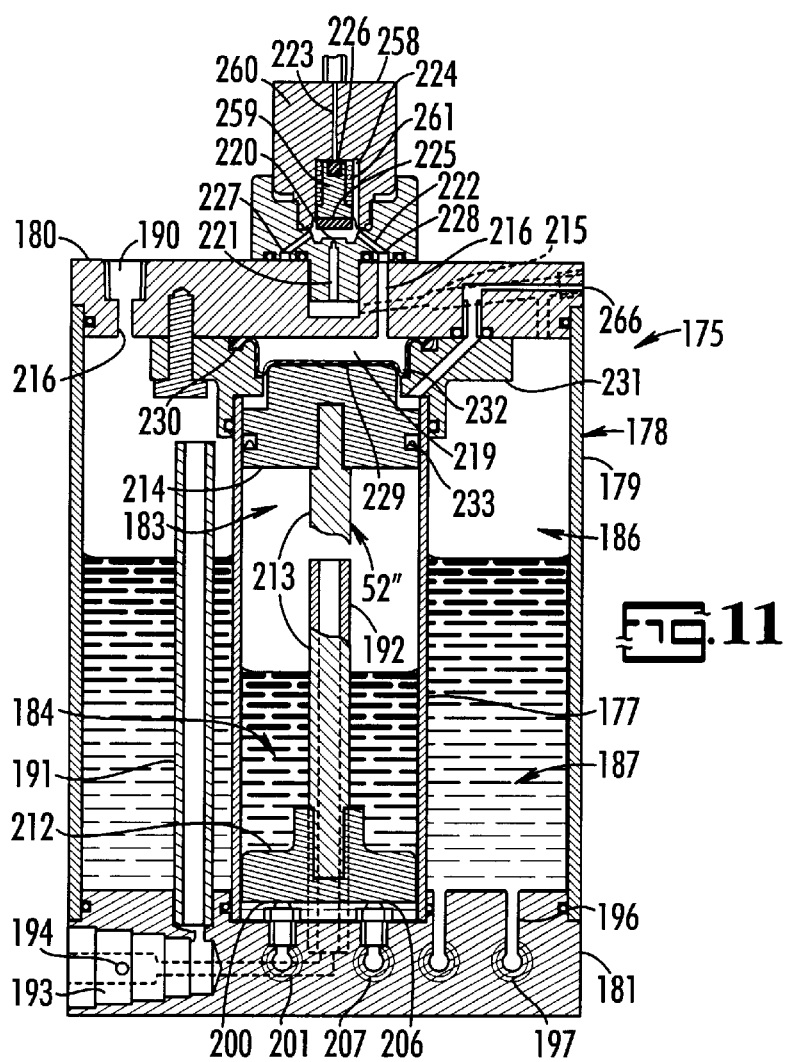
FIG. 11 is an enlarged sectional view of the valved accumulator assembly taken along line 11—11 of FIG. 10.

Referring now to FIGS. 9, 10 and 11, there is shown another modification of the invention wherein the air actuated trim valve assembly 52 in the intermediate head of FIG. 2 has been replaced by an air actuated trim valve assembly 52" in a modified accumulator assembly 175 having a valve member 212. Since the components of the air source and the control, trim and resistance assemblies are essentially the same as for the embodiment of FIG. 2, except for a modified intermediate head 50", the same numerical designations have been used for the essentially same components of these assemblies.

The accumulator assembly, generally designated 175, includes an inner low pressure section 176 defined by an inner cylindrical wall 177 and an outer annular high pressure section 178 defined by the inner wall 177 and a concentric outer cylindrical wall 179, the walls 177 and 179 being secured between a cover 180 and a base 181. As may be seen in FIGS. 10 and 11, the inner section is filled with a liquid through a fill tube 182 to create a low pressure gas chamber 183 and a trim liquid reservoir 184, and the outer section is filled with a liquid through a fill tube 185 to create a high pressure gas chamber 186 and a resistance liquid reservoir 187. The chamber 186 is connected to the high pressure gas supply 88 via the gas line 89 and a port 190 in cover 180. The low pressure chamber 183 is connected to the high pressure chamber 186 via a high pressure standpipe 191, a low pressure standpipe 192, and a pressure regulator 193 located in a base passage 194 between the standpipes for reducing the gas pressure from that desired in chamber 186 to that desired in chamber 183.

The high pressure reservoir 187 is connected via a base passage 196, a base port 197 and a line 198 to a passage 199 in intermediate head 50", and head passage 199 in turn is connected to resistance chambers 55 and 56 as described above for passage 99. The low pressure reservoir 184 is connected via a port in the form of a valve seat 200, a base passage 201 and a line 203 to a passage 204 in intermediate head 50", and head passage 204 in turn is connected to trim chamber 34 via the annular passage 69 defined by the housing 32 and the trim cylinder 33 and leading to the chamber port 70. The low pressure chamber 183 is connected via a port in the form of a valve seat 206, a base passage 207 and a line 209 to a passage 210 in intermediate head 50", and head passage 210 in turn is connected to trim chamber 35 via the chamber port 73.

Operation of the low pressure trim section 176 of the accumulator assembly 175 is controlled by a solenoid actuated valving arrangement that includes the valve seats 200 and 206. These seats are opened and closed by the valve member 212 that is connected by a rod 213 to a valve piston 214 that actuates the valve member to its closed position when high pressure air is fed to a pressure chamber 219 above the piston through passages 215 and 216 in the accumulator cover when a solenoid 260 is in its activated condition. Solenoid 260 is momentarily deactivated for a trimming adjustment by the remote electrical switch 62 as described below. The valve member 212 has a slot 234 (FIG.

10) for receiving the low pressure standpipe 192 such that the valve member reciprocates along this standpipe as it moves between its open and closed positions.

Although switch 62 may be hard wired to the solenoid, it is preferable a remote switch that may be mounted on the steering wheel 38 of a motor vehicle for generating a radio signal to activate the solenoid via a radio signal receiver 117. The ON position of switch 62 activates a signal generating unit 118 that in turn activates the signal receiver 117 causing it to supply an electrical current from a power source 63 to the solenoid 260. With this option, the switch 65 of a relay 64 does not close until the receiver section 117 receives an ON signal from the remote unit 118. Similarly, an OFF signal or the absence of a signal from unit 118 opens switch 65. As may be seen best in FIG. 11, the solenoid 260 is secured to the accumulator cover 180 by an adapter 258 having a valve seat 220 between an inlet passage 221 connected to cover passage 215 and a transfer passage 222 connected to the cover passage 216. Internal to the solenoid is a double ended plunger 259 having at its lower end a valve element 225 that is moved upward away from the valve seat 220 by the solenoid 260 when it is activated so that the differential between high and low pressure air will force the main valve member 212 to close the main valve seats 200 and 206. In other words, when the solenoid 260 of the air valve is actuated by an electric current supplied thereto by the radio receiver 117 in response to the electrical switch 62 being in its ON position, the plunger 259 compresses spring 261 and causes valve element 225 to open valve seat 220. A differential between high and low pressure air will then act on the trim valve piston 214 and force the trim valve member 212 to close the trim valve seats 200 and 206.

In the absence of electrical power, i.e., when the switch 62 is in its OFF position, solenoid plunger 259 is pushed downward by the compressed return spring 261 so that valve element 225 closes the valve seat 220 and thereby the flow path for pressurized air to reach the valve piston 214. When valve seat 220 is closed, the chamber 219 adjacent the piston 214 is vented to the atmosphere via the head passage 216, the adapter passage 222, and solenoid vent passages 224 and 223 through solenoid 260. The venting of chamber 219 allows the differential between trim system pressure and ambient pressure, which may be aided by a compression spring (not shown), to open the valve seats 200 and 206 by pushing away therefrom the piston 214, which in turn pulls away therefrom the valve member 212 connected to the piston by rod 213. The trim valve assembly 52" is thereby actuated to its open position. When valve seat 220 is reopened to actuate the valve assembly 52" to its closed position, the vent passage 223 is closed by a valve element 226 at the upper end of solenoid plunger 259.

A plurality of the passages 222 communicate with an annular channel 227 leading to the cover passage 216 and an annular filter 228 is preferably provided in the channel 227 to prevent any contaminates from the solenoid or the vent passage 223 from entering the pressure chamber 219 above the valve piston 214. To insure that there is no fluid communication from the high pressure section to the low pressure section, a bellofram diaphragm 229 extends completely over and seals the top or actuating surface of the valve piston 214. The diaphragm 229 has a rib 230 around its outer edge and is held in place by clamping this rib between the cover 180 and a flanged member 231 defining the upper end of the low pressure chamber 183. The diaphragm also includes an annular loop segment 232 that permits reciprocation of the valve piston while maintaining the desired seal between the piston 214 and the cover 180. An annular U-cup seal 233 around the piston 214 insures that there is no fluid communication from the low pressure chamber 183 to the underside of the diaphragm 229 when the pressure chamber 219 is opened to the vent passage 223. Appropriate O-ring seals, as represented by small black or cross-hatched circles in the drawings, are provided between the various components of the invention across which there may be a pressure differential.

When trim valve 52" is in its open position with solenoid 260 deactivated (valve seat 220 closed and valves seats 200 and 206 open), a fluid, preferably a liquid, is supplied from the trim reservoir 184 to the trim chambers 34 and 35. Therefore, trim piston 36 is released to move in trim cylinder 33 away from its previously locked position C1 (valve seat 220 open and valve seats 200 and 206 closed) to a new position C2 as illustrated in FIG. 9.

Referring now to FIGS. 12, 13 and 14, there is shown another modification of the invention that may be more economical to manufacture than the other versions described above, without significantly affecting performance. In this embodiment, the air actuated trim valve assembly 52 in the intermediate head of FIG. 2 has been replaced by an air actuated trim valve assembly 301 in a modified accumulator assembly 275 having a valve member 312. Since the components of the air source and the control, trim and resistance assemblies are essentially the same as for the embodiment of FIG. 9, the same numerical designations have been used for the essentially same components of these assemblies as in FIG. 9.

The accumulator assembly, generally designated 275, includes a single pressurized enclosure 278 defined by an outer cylindrical wall 279 secured between a cover 280 and a base 281 by a series of bolts 283 passing through flanges 282 projecting outward from the cover and the base. The enclosure 278 is filled with a liquid through a fill tube 285, that is similar to the fill tubes 182 and 185 of FIG. 10, to create a single gas chamber 285 and a single liquid reservoir 287. The chamber 286 is connected to the high pressure gas supply 88 via a gas line 289, a solenoid air valve 292 and a gas line 293. As an alternative, the gas line 289 and valve 292 may instead be connected to the gas line 167 and its related pressure varying components shown in FIG. 8.

The liquid reservoir 287 is connected via a base passage 296, a base port 297 and a line 298 to the passage 199 in intermediate head 50", and head passage 199 in turn is connected to resistance chambers 55 and 56 as previously described. The liquid reservoir 287 is also connected via a port in the form of a valve seat 300, a base passage 299 and a line 303 to the passage 204 in intermediate head 50", and head passage 204 in turn is connected to trim chamber 34 via the annular passage 69 defined by the housing 32 and the trim cylinder 33 and leading to the chamber port 70. The liquid reservoir 287 is also connected via a port in the form of a valve seat 306, a base passage 307 and a line 309 to the passage 210 in intermediate head 50", and head passage 210 in turn is connected to trim chamber 35 via the chamber port 73.

Operation of the trim or locking piston 36 is controlled by the air actuated valve assembly 301 that includes the valve seats 300 and 306. These seats are opened and closed by a valve member 312 connected by a rod 313 to a valve piston 314 that actuates the valve member to its closed position when high pressure air is fed to a piston chamber 319 above the valve piston. The pressurized air is fed from the air source 88 through an air supply line 308 and a solenoid air valve 360 that is normally held open by actuation of its solenoid to pressurize chamber 319. The air from line 308 is fed through a port 357 in a top plate 358 that, together with a cylinder 359 and the cover 280, defines the piston chamber 319 and a lower vented chamber 324. Vented chamber 324 is vented to ambient pressure via a vent passage 325 and is sealed from piston chamber 319 by a diaphragm 329. The air pressure feed is interrupted (stopped) upon closure of the air valve 360 when the valve solenoid is deactivated in response to briefly turning off the remote electrical switch 62 to trim the vehicle steering system into a new centered position.

The solenoid air valve 292 in the main airline 289 is preferably a normally open valve when its solenoid is deactivated and is hard wired to a separate manually actuated switch 295 for use primarily during maintenance when it may be turned on to activate the solenoid and close the valve, thereby isolating the accumulator enclosure 278 from the air pressure source 88 during accumulator maintenance. When the solenoid of valve 292 is deactivated, the valve plunger (not shown) is held open by a compression spring positioned to push the valve member away from the valve seat, i.e., the spring is positioned opposite to that of spring 61 of valve 109 in FIG. 7. Due to this arrangement, full fluid pressure is always available in the enclosure 278 for operation of the trim assembly 28 and the resistance assembly 30 during vehicle operation.

Except for the difference in valve 292 described above, valves 292 and 360 may be essentially the same as valve 109 shown in FIG. 7 and have respective vent lines 294 and 361 for dumping to ambient the air pressure in respective chambers 286 and 319 when these air valves are closed to isolate these chambers from the pressurized air source 88. The line 293 upstream of valve 292 may be connected directly to the pressurized air source 88 as shown in FIG. 12, or via the line 167 and its associated variable pressure system shown in FIG. 8.

Although switch 62 may be hard wired to the solenoid of valve 360, it is preferable a remote switch that maybe mounted on the steering wheel 38 of a motor vehicle for generating a radio signal to activate the solenoid via a radio signal receiver 117. The ON position of switch 62 activates the signal generating unit 118 that in turn actuates the signal receiver 117 causing it to supply an electrical current from a power source 63 to the valve solenoid in the same manner that solenoid 60 is actuated in the embodiment of FIG. 2.

In the absence of electrical power, i.e., when the respective switches 295 and 62 are in their OFF positions, the solenoid plunger (not shown) of valve 292 is moved by its compression spring away from its corresponding main valve seat to open it and the flow path for pressurized air to reach the chamber 286, and the solenoid plunger (not shown) of valve 360 is moved by its compression spring against its corresponding main valve seat to close it and the flow path for pressurized air to reach the chamber 319.

When the main seats of each of the valves 292 and 360 are open, the respective vent lines 294 and 361 are closed by vent valve elements and seats (not shown) adjacent the ends of the solenoid plungers opposite to the ends adjacent the main valve elements and seats, the plungers, valve elements and internal seats and passages being essentially the same as for valve 109 shown in FIG. 7. On the other hand, when the valves 292 and 360 are closed, the chambers 286 and 319 are vented to the atmosphere via the respective vent lines 294 and 361 in the same way that chamber 119 of FIG. 6 is vented through the vent passage 123 of valve 109 in FIG. 7.

To insure that there is no fluid communication from the high pressure chamber 319 to the low pressure chamber 324, a bellofram diaphragm 329 extends completely over and seals the top or actuating surface of the valve piston 314. The diaphragm 329 has an annular rib 330 around its outer edge and is held in place by clamping this rib in an annular groove 327 between the top plate 358 and the cylinder 359 defining the piston chamber 319. The diaphragm also includes an annular loop segment 332 that permits reciprocation of the valve piston 314 while maintaining the desired seal between the piston and the top plate. An annular U-cup seal 328 around the piston rod 313 insures that there is no fluid communication from the main pressure chamber 286 to the underside of the diaphragm 329 that is exposed to ambient pressure via low pressure chamber 324 and vent passage 325. Appropriate O-ring seals, as represented by small black circles in the drawings, are provided between cylinder 359 and cover 280, cover 280 and cylinder 279, and cylinder 279 and base 281, across the interfaces of which there may be a pressure differential.

The venting of chamber 319 via valve 360 allows compression springs 322, 322 acting against the underside of valve member 312 to open the valve seats 300 and 306 by pushing away therefrom the valve member 312 as shown in FIG. 14. When trim valve 301 is thereby in its open position because the solenoid of valve 360 is deactivated, a fluid, preferably a liquid, flows between the reservoir 287 and the trim chambers 34 and 35. Therefore, trim piston 36 is released to move in trim cylinder 33 away from its previously locked position C1 to a new position C2 as illustrated in FIG. 9 and described above in connection therewith.

The opening and closing movement of valve member 312 is guided by a guide plate 320 and by a guide pin 321 to keep the small cylindrical valve elements or pads 316 and 318 properly aligned with the valve seats 300 and 306, respectively, to completely seal the same when the valve member 312 is in its closed (down) position. Plate 320 is secured to the cylinder base 281 and has an upstanding flange or guide fin 323 that reciprocates in a guide channel 326 in the body of the valve member 312. Pin 321 is secured to the cylinder base 281, passes through an aperture 317 (FIG. 13) in plate 320 and reciprocates in a guide bore 315 in the body of the valve member 312. The fin 323 also functions as a flow divider to keep separate and smooth, i.e., with little or no turbulence, the currents of liquid flowing into and out of the valve seats 300 and 306.

Persons skilled in the art, upon learning of the present disclosure, will recognize that various modifications to the assemblies, and to the components and the elements of the assemblies, of the invention are possible without significantly affecting their functions. For example, a gas such as air may be used as the fluid in both the trim assembly and the resistance assembly of FIGS. 2, 8, 9 and 12. Also, other components may be substituted for those of the trim and resistance assemblies disclose herein by way of illustrating the present invention. For example, separate accumulators may be substituted for the combined accumulator assemblies shown in the drawings, such as the separate accumulator arrangement illustrated in the related U.S. application Ser. No. 09/699,520 on a Center Holding Assembly For Vehicle Steering Systems, the entire contents of which is incorporated herein by reference.

Similarly, other pressurizing assemblies utilizing the same or other fluids may be substituted for the hydraulic accumulators shown. One such alternative is to replace the single pressure regulator between the two accumulator sections 76 and 78 with dual pressure regulators in dual gas supply lines that are respectively connected to the low and high pressure sections 76 and 78. A second such alternative is to use the single joint accumulator of FIG. 12 in combination with dual pressure regulators placed directly in the fluid supply lines 98 and 103 that are respectively connected to the resistance and trim assemblies. In this second alternative, a pressurized gas instead of a pressurized liquid could be used as the working fluid in both the trim assembly 28 and the resistance assembly 30. Accordingly, while the preferred embodiments have been shown and described in detail by way of example, further modifications and embodiments are possible without departing from the scope of the invention as defined by the claims set forth below.

What is claimed is:

1. An apparatus for holding at a center position at least one steerable member mounted on a frame means for movement to either side of the center position, said apparatus comprising linkage means of variable length extending between said steerable member and said frame means, the length of said linkage means defining said center position and said linkage means comprising resistance means for providing a resistance force resisting steering forces tending to move said steerable member to either side of the center position, and trim means for transmitting said steering forces to said resistance means;

wherein said trim means comprises:
a trim piston,
trim cylinder means for providing first and second trim chambers one on each side of said trim piston,
and trim fluid means for providing a flow of trim fluid to and from each of said trim chambers and comprising trim valve means operable between a closed position for preventing said trim fluid flow so that said trim piston is held in a locked position, and an open position for allowing said trim fluid flow so that said trim piston is free to move away from said locked position in said trim cylinder, said trim piston movement causing trim fluid flow to one of said trim chambers and trim fluid flow from the other of said trim chambers to permit trimming movement of said steerable member to another center position by changing the length of said linkage means in response to said steering forces;

wherein said resistance means comprises,
resistance cylinder means providing a portion of said linkage means,
resistance piston means cooperating with said resistance cylinder means to define first and second resistance chambers, and being arranged for movement in a first direction for compressing a fluid within said first resistance chamber and for movement in a second direction for compressing a fluid within said second resistance chamber,
resistance rod means for providing another portion of said linkage means and arranged for movement with said resistance piston means to either side of a neutral position corresponding to said center position,
connecting means for connecting said resistance rod means or said resistance cylinder means to said steerable member for movement therewith,
and resistance fluid means for providing a pressurized resistance fluid in each of said first and second resistance chambers so that fluid pressure provides said resistance force by causing said piston means to be biased toward said neutral position, said bias opposing movement of said steerable member toward either side of said center position;

wherein said trim fluid means comprises:
trim accumulator means having a trim reservoir for holding a supply of said trim fluid, and means for pressurizing the trim fluid held in said reservoir,
and trim conduit means for providing fluid flow between said trim chambers and said trim reservoir when said trim valve means is in its open position; and, wherein said resistance fluid means comprises:
resistance accumulator means having a resistance reservoir for holding a supply of said resistance fluid, and means for pressurizing the resistance fluid held in said reservoir,
and resistance conduit means for providing fluid flow between said resistance chambers and said resistance reservoir when said resistance piston means moves away from said neutral position in said resistance cylinder means.

2. An apparatus according to claim 1, wherein said trim conduit means comprises a first conduit for communicating with said trim reservoir to supply trim fluid to said first trim chamber, a second conduit for communicating with said trim reservoir to supply trim fluid to said second trim chamber, a first port for providing fluid communication between said trim reservoir and said first conduit, and a second port for providing fluid communication between said trim reservoir and said second conduit; and wherein said trim valve means is arranged for simultaneously closing and simultaneously opening both of said first and second ports.

3. An apparatus according to claim 2, wherein said first port comprises a first valve seat and said second port comprises a second valve seat; and wherein said trim valve means further comprises:
a valve member arranged for reciprocating movement between a closing position for causing simultaneously closure of said first and second valve seats and an opening position for causing simultaneously opening of said first and second valve seats,
a piston member connected to said valve member for causing said valve member movement in response to closing and opening pressure differentials across said piston member,
and differential pressure means for providing said pressure differentials.

4. An apparatus according to claim 3, wherein said resistance accumulator means is pressurized to a higher pressure than said trim accumulator means, and wherein said trim valve means further comprises a solenoid valve means actuatable between a first position for causing resistance accumulator pressure to provide said closing pressure differential and a second position for causing trim accumulator pressure to provide said opening differential pressure.

5. An apparatus according to claim 4, wherein said trim valve means further comprises a third conduit means connected to a resistance gas chamber of said resistance accumulator means for supplying resistance gas to a resistance gas side of said piston member, a fourth conduit means connected to a vent space for receiving resistance gas vented from the resistance gas side of said piston member, a third valve seat leading to said third conduit means, a fourth valve seat leading to said fourth conduit means, and a plunger member movable to simultaneously open said third valve seat and close said fourth valve seat in response to actuation of said solenoid valve means to its first position and movable to simultaneously close said third valve seat and open said fourth valve seat in response to actuation of said solenoid valve to its second position.

6. An apparatus according to claim 3, wherein said resistance accumulator pressure acts on a resistance gas side of said piston member and said trim accumulator pressure acts on a trim gas side of said piston member, and wherein a flexible diaphragm is provided on said resistance gas side to prevent fluid communication between said sides.

7. An apparatus according to claim 1, wherein said trim fluid is a trim liquid, and wherein said trim accumulator means further comprises:
trim gas chamber for pressurizing the trim liquid held in said trim reservoir;
and means for pressurizing said trim gas chamber with a gas to pressurize the trim liquid in said trim reservoir, said pressurizing means permitting the pressure of said gas to be varied so as to vary the liquid pressure.

8. An apparatus according to claim 7, wherein said resistance fluid is a resistance liquid, and wherein said resistance accumulator means further comprises:
a resistance gas chamber for pressurizing the resistance liquid held in said resistance reservoir;
and means for pressurizing said resistance gas chamber with a gas to pressurize the resistance liquid in said resistance reservoir, said pressurizing means permitting the pressure of said gas to be varied so as to vary the liquid pressure.

9. An apparatus according to claim 8, wherein said resistance gas chamber is pressurized to a higher pressure than said trim gas chamber, and wherein said trim pressurizing means comprises:
said resistance gas chamber,
accumulator conduit means for transferring pressurized gas from said resistance gas chamber to said trim gas chamber,
and pressure reducing means associated with said accumulator conduit means for reducing the pressure of said transferred gas from the resistance chamber pressure to the trim chamber pressure.

10. An apparatus according to claim 9, wherein said accumulator conduit means comprises a standpipe in said resistance reservoir connected to a standpipe in said trim reservoir for transferring gas through the liquids in said reservoirs.

11. An apparatus according to claim 9, wherein the chamber and reservoir of said resistance accumulator means have annular cross sections and are arranged concentrically around the chamber and reservoir of said trim accumulator means.

12. An apparatus according to claim 1,
wherein said resistance piston means comprises a first resistance piston cooperating with said resistance cylinder means to define said first resistance chamber, and a second resistance piston cooperating with said resistance cylinder means to define said second resistance chamber, each of said first and second resistance pistons being arranged to move independently of the other between a retracted position and a position for compressing a fluid within its corresponding chamber; and,
wherein said resistance rod means comprises a rod head arranged for movement to either side of said neutral position corresponding to said center position, and an elongated rod for causing said rod head to engage each of said pistons independently of the other so that movement of said rod head away from said neutral position to one side causes compressive movement of said first piston without moving said second piston and movement of said rod head away from said neutral position to the other side causes compressive movement of said second piston without moving first piston, resistance fluid pressure in each of said first and second resistance chambers providing said resistance force by causing said pistons to bias said rod head toward said neutral position, and said bias opposing movement of said steerable member toward either side of said center position.

13. An apparatus according to claim 1 further comprising operating means for operating said trim valve means between said open and closed positions in response to a remote input, and control means for providing the remote input to said operating means, and wherein said trim valve means is in its open position until said remote input is provided to said operating means.

14. An apparatus according to claim 13, wherein said operating means is actuatable in response to a radio signal, and wherein said control means comprises signal means activatable at a location remote from said operating means for providing said radio signal thereto.

15. An apparatus according to claim 2, wherein said trim valve means further comprises:
an actuator comprising an actuating member operable between a first position and a second position in response to a remotely generated signal, and
a valve member connected to said actuating member and arranged for reciprocating movement between a closing position for causing simultaneously closure of said first and second ports and an opening position for causing simultaneously opening of said first and second ports, said closing position corresponding to the first position of said actuating member and said opening position corresponding to the second position of said actuating member.

16. An apparatus according to claim 3, wherein said trim valve means is located in said trim accumulator means.

17. An apparatus according to claim 3, wherein said trim cylinder means and said resistance cylinder means are interconnected by an intermediate head member, and wherein said trim valve means is located in said intermediate head member.

18. An apparatus for holding at a center position at least one steerable member mounted on a frame means for movement to either side of the center position, said apparatus comprising linkage means of variable length extending between said steerable member and said frame means, the length of said linkage means defining said center position, and accumulator means comprising a reservoir for holding a supply of fluid and means for pressurizing the fluid held in said reservoir;
wherein said linkage means comprises resistance means for providing a resistance force resisting steering forces tending to move said steerable member to either side of the center position, and trim means for transmitting said steering forces to said resistance means;
wherein said trim means comprises:
a trim piston,
and trim fluid means for providing a flow of trim fluid between said accumulator reservoir and each of said trim chambers and comprising trim valve means operable between a closed position for preventing said trim fluid flow so that said trim piston is held in a locked position, and an open position for allowing said trim fluid flow so that said trim piston is free to move away from said locked position in said trim cylinder, said trim piston movement causing trim fluid flow to one of said trim chambers and trim fluid flow from the other of said trim chambers to permit trimming movement of said steerable member to another center position by changing the length of said linkage means in response to said steering forces;

wherein said resistance means comprises:
  resistance cylinder means providing a portion of said linkage means,
  resistance piston means cooperating with said resistance cylinder means to define first and second resistance chambers, and being arranged for movement in a first direction for compressing a fluid within said first resistance chamber and for movement in a second direction for compressing a fluid within said second resistance chamber,
  resistance rod means for providing another portion of said linkage means and arranged for movement with said resistance piston means to either side of a neutral position corresponding to said center position,
  connecting means for connecting said resistance rod means or said resistance cylinder means to said steerable member for movement therewith,
  and resistance fluid means for providing a pressurized resistance fluid in each of said first and second resistance chambers so that fluid pressure provides said resistance force by causing said resistance piston means to be biased toward said neutral position, said bias opposing movement of said steerable member toward either side of said center position;

and wherein said trim valve means comprises:
  a first conduit for communicating with said reservoir to supply trim fluid to said first trim chamber,
  a second conduit for communicating with said reservoir to supply trim fluid to said second trim chamber,
  a first port for providing fluid communication between said reservoir and said first conduit,
  a second port for providing fluid communication between said reservoir and said second conduit,
  and a valve member arranged for reciprocating movement between a closing position for causing simultaneously closure of said first and second ports and an opening position for causing simultaneously opening of said first and second ports.

19. An apparatus according to claim 18, wherein said trim valve means further comprises a piston member connected to said valve member for causing said valve member movement in response to closing and opening pressure differentials across said connected piston member, and differential pressure means for providing said pressure differentials.

20. An apparatus according to claim 19, wherein said differential pressure means comprises actuating means for providing said closing pressure differential in response to the opening of a solenoid valve in a fluid conduit to pressurize a fluid on one side of said connected piston, and for providing said opening pressure differential in response to the closure of said solenoid valve to remove fluid pressure from said one piston side.

21. An apparatus according to claim 18, wherein said trim valve means further comprises actuating means for causing said valve member closing movement in response to activation of a solenoid and said valve member opening movement in response to deactivation of said solenoid.

22. An apparatus according to claim 18, wherein said trim valve means further comprises actuating means for causing said valve member movement in response to closing and opening signals provided to a solenoid of said actuating means, and wherein said apparatus further comprises signal means for providing said closing and opening signals.

23. An apparatus according to claim 18, wherein said trim valve means further comprises an actuating member operable between a first position and a second position in response to a remotely generated signal, said closing position corresponding to the first position of said actuating member and said opening position corresponding to the second position of said actuating member.

24. An apparatus according to claim 18, wherein said trim valve means is located in said trim accumulator means.

25. An apparatus according to claim 18, wherein said trim cylinder means and said resistance cylinder means are interconnected by an intermediate head member, and wherein said trim valve means is located in said intermediate head member.

* * * * *